March 6, 1973 C. ZENSES 3,719,109
RASP AND METHOD FOR ITS MANUFACTURE
Filed Aug. 3, 1970

INVENTOR
CARL ZENSES

ATTORNEYS

3,719,109
RASP AND METHOD FOR ITS MANUFACTURE
Carl Zenses, Duppelstrasse 58, Remscheid-Haddenbach, Germany
Continuation-in-part of application Ser. No. 681,704, Nov. 9, 1967. This application Aug. 3, 1970, Ser. No. 60,575
Int. Cl. B21k 21/00
U.S. Cl. 76—101 A                    10 Claims

ABSTRACT OF THE DISCLOSURE

There is provided a rasp in the form of a cylindriform rasp body open at one end and closed at its other end with a shaft projecting from the closed end and adapting the rasp for mounting on a driving motor, rasp cutting serrations being angularly disposed on the end surface of the cylindrical wall at the open end of the body. The body may have thereon a flange-like widening at the open end of the body and equipped with rasp cutting media and this widening may be integral or formed on an insert mountable in the hollow of the body, or the rasp optionally may include a spring projected centering plunger in the hollow of the insert, or it may include a spiral drill projecting axially a predetermined distance beyond the open end of the body and forming an integral part of the mounting shaft.

---

This application is a continuation-in-part of application Ser. No. 681,704, now Pat. No. 3,550,229.

This invention relates generally to rasps or the like adapted for use in the working of wood and similar materials, and especially to having a cylindrical body and a shaft disposed for being clamped in a drive device such as the chuck of a boring machine.

In rasps of the kind mentioned, the body is, as a rule, formed as a solid cylinder to which the mounting shaft is attached. This applies especially to rasps the bodies of which are in each instance provided with one of the various types of cutting media such as the normal rasp cut or a so-called pocket cut or a smooth cut. Cylindrical rasps are known, the rasp bodies of which are shaped as hollow cylinders of thin plate which are closed at both ends by circular plate disks one of which carries the shaft which serves as the means through which the tool may be clamped in a driving motor. These last mentioned rasps cannot be provided with the known types of rasp cutting media, however, because the means for accomplishing this purpose is not available, and they are therefore formed in the nature of a grater.

The present invention seeks to combine the advantages of the known kinds of rasps while avoiding their respective disadvantages, and to provide a novel form of tool which is substantially more universally applicable than the hitherto known rasps and which therefore is especially suited for use as a successful device of the homeworker or do-it-yourself type.

The invention provides for this purpose in a rasp of the kind mentioned having a cylindrical body and a mounting shaft, that the rasp body is formed as a hollow cylinder open at one end and that the open end surface of the cylinder wall is provided with serrated filing or rasp cutting media. It is to be understood that the expression "hollow cylinder" is not to be considered as limited to a cylinder with an elongated hollow space, but rather is to be considered as embacing any cylinder body the face end of which is more or less deeply hollowed out. With such a shaping of the rasp body, it is assured that extremely sharp-edged work can be done with the tool, which as a rule is not possible with the known kinds of rasps. In addition to this advantage, as compared with the known kinds of rasps, the use of a hollow cylinder, open at one end, as a rasp body in connection with face serrations or cutting media on the open face surface of the cylinder wall provides the additional advantage that the tool is not only usable for all hitherto possible kinds of work, but it can, in addition, be applied, for example to the boring or cutting of holes or taps.

Especially for the cutting of taps, it will be found practical to make a modified form of the tool described above wherein the open edge or end extremity of the cylindrical rasp body is widened in the form of a flange provided, at least on the face surface adjoining the cylinder opening, with a rasp or file cutting media. Also, the outer edge of the flange-like widening may be provided with a rasp or file cutting media or the like. Such a tool creates a certain free space around the cup tap which facilitates the removal of material which perhaps remains standing between several taps that are to be placed next to each other.

In order to favor an especially sharp-edged job with such a tool, a narrow rib can be provided along the outer edge of the flange-like widening and projecting above its face, the height of said rib corresponding to the height of the rasp cut on the face. By this means there is created the possibility of bringing the rasp cut on the peripheral area of the widening to the edge of this rib and thereby to the height of the points of the rasp cut on the face, for which purpose the face of the rib is suitably turned down after the peripheral area has been provided with the desired rasp cut.

The diameter of the flange-like widening of the edge of the rasp body, in the case of small distances between taps, can be selected about equal to the tap distance so that the necessity for a reworking between the taps is eliminated.

In placing the rasp cutting media or serrations on the face of the hollow cylinder, one can take care that the serrations on the inner cross section of the hollow cylinder project to a small extent beyond the cylinder wall. Thereby the cut becomes a trifle wider than the thickness of the cylinder wall with the outside serration, so that material penetrating into the interior space of the tool can be more readily removed. For the same purpose, openings can be provided at the opposite end of the rasp body in its end wall to facilitate discharging or clearing of such.

Also, it may sometimes also be advisable to bore out the center opening of the hollow cylinder to the intended dimension after the face of the cylinder wall has been serrated.

A rasp body and a drive shaft can be combined in one piece. Also, one can make the rasp body so that it can be clamped onto the drive shaft. Thus, for example, in a special embodiment of the rasp according to the invention, the rasp body can be combined with a drill bit which extends a predetermined distance beyond the open end of the rasp body, thereby to make it possible, when using the tool for boring holes, to initiate the boring accurately and securely. For this purpose a fitted boring for the drill shaft can be provided in the rasp body in which the said shaft can be clamped as by a set screw.

Also, the flange-like widened edge of the rasp body can be combined in one piece with the cylinder wall. It is possible to provide an insert with a cylindrical central opening, which insert can be introduced into the cylinder opening and clamped fast therein, the insert carrying the flange-like widened edge. Thus, the widened edge can be applied and again taken off as needed.

In order to facilitate working with such a tool, and especially the centering in relation to the tap to be cut, there can be introduced into the central opening of the insert a center punch that can be pushed back against the pressure of a spring, and the pointed end of which projects from the insert so as to be usable as a centering point. This center punch is suitably inserted loosely into the central opening, so it can be taken out of the central opening and not hinder the advance of the tool after the same has been centered and the tap has been started.

The invention furthermore provides for a novel method of manufacturing the above-described rasps or their rasp bodies, whereby, according to the invention, after formation of the solid or only slightly hollowed cylindrical foundation body, which, if desired, can be combined in one piece with the clamping shaft, the rasp cut is first applied to its cylindrical surface and the cylinder is then bored out to the desired cylinder wall thickness, whereupon finally the serration of the open end face of the hollow cylinder is accomplished, for example, by a rasp or file cut, after the open face of the cylinder body, if necessary, has first been refinished somewhat, for example by slightly turning or grinding thereof.

With the above and other objects in view that will hereinafter appear, the nature of the invention will be more clearly understood by reference to the following detailed description, the appended claims and the several views illustrated in the accompanying drawing.

Figure 1:
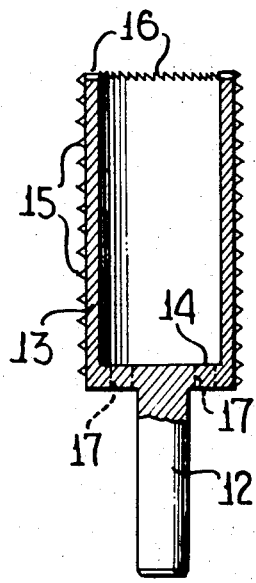
FIG. 1 is a sectional view and part elevation illustrating the basic development of the invention.
Figure 2:
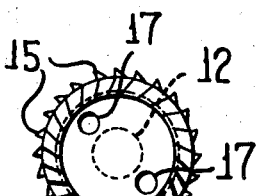
FIG. 2 is a top plan view looking toward the cutting end face of the form of tool shown in FIG. 1.

In the embodiment according to FIGS. 1 and 2, the cylindrical rasp body 11 and the shaft 12 adapting the tool for being readily clamped into a driving motor are combined with each other in one piece. The rasp body is formed as a hollow cylinder whose inner space 13 is closed at the shaft end 12 by an end wall 14. The cylinder 11 is open at the opposite end. On the outside it is provided with rasp cutting media 15. Preferably, this rasp cut or formation of the rasp cutting media was accomplished when the rasp body 11 was still solid or still had thick walls. After application of the rasp cutting media, the wall thickness of the rasp body is brought to the desired dimension. Thereupon the face or open end extremity of the cylinder wall is provided with serrations 16, which in the embodiment illustrated are in the form of file cuts. This serration extends on the inner periphery of the hollow cylinder somewhat beyond its interior surface, as shown in FIG. 1. Moreover, the direction of the tooth elements of the serration need not run radially, but it can, as is seen in FIG. 2, be inclined from the inside to the outside in relation to the radius, preferably in the direction of the rotation, as shown, so that material loosened during operation of the tool will be transported to the outer circumference. Stated another way, it will be apparent from the foregoing and from FIG. 2 of the drawing that the serrations or file cuts 16 formed on the face or open end extremity of the cylinder wall are disposed in tangential relation to an imaginary circle struck from the axis of the cylindrical body 11. Openings 17 are provided in the end wall so that cut out material, if necessary, can be ejected from the interior of the hollow cylinder.

Figure 3:
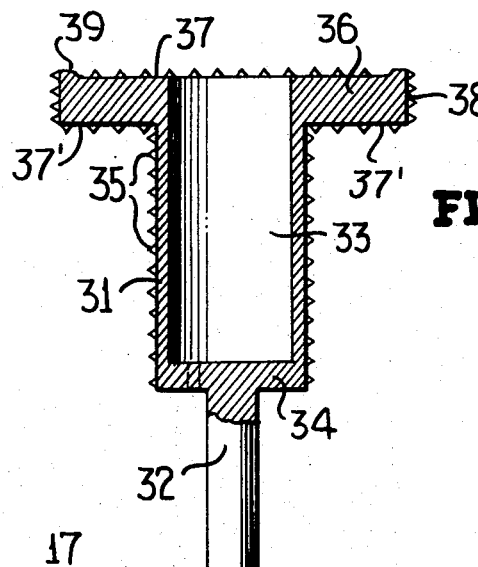
FIG. 3 is a view similar to FIG. 1 showing a modified form of tool embodying a flange-like widened rim.

In the embodiment of the tool shown in FIG. 3, the cylindrical rasp body 31 and the shaft 32 adapting the tool for ready mounting in a driving motor are, as in the implement according to FIGS. 1 and 2, combined with each other in one piece, and the rasp body is again formed as a hollow cylinder whose interior space 33 is closed at the shaft end by an end wall 34. Again, as in the preceding embodiment, rasp cutting media 35 can then be applied to the outside of the rasp body. A widening 36 is provided at the open end of the cylinder 31, this being in the nature of a flange. This flange-like widening 36 is provided with rasp cutting media both on its face 37 with which it directly adjoins the cylinder opening 33, and on its outer periphery 38. The flange-like edge can also be provided with rasp teeth or the like on its back side face 37' opposite the face 37 so that the tool can be used for the making of slots. The diameter of the flange-like widening 36 is appropriately adjusted to the distance which the taps to be made are to have from each other. Therefore, the diameter of flange 36 should be made about equal to the distance of the taps. In any case, i.e. also with greater distances between the taps, a space is cleared around the taps so that material that may have been left standing between the taps can be removed without difficulty. A rib 39 about the outside margin of the face 37, as shown in FIG. 3, makes possible the placement of the rasp teeth on the peripheral surface 38 to the height of the rasp cutting media or teeth on surface 37.

Figure 4:
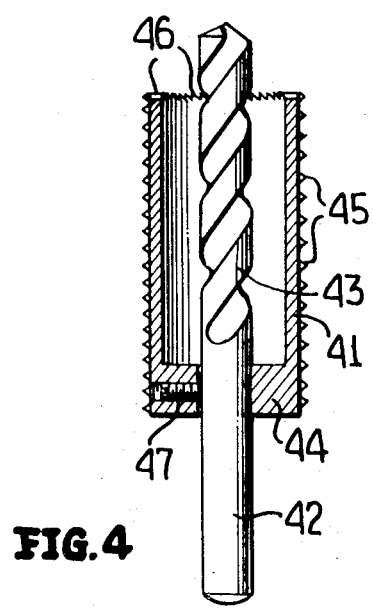
FIG. 4 is a view similarly to FIG. 1 showing a further modified embodiment of the invention adapted to be mounted on a drill shaft.

The embodiment of the tool shown in FIG. 4 differs from that of FIGS. 1 and 2 essentially in that rasp body 41 and mounting shaft 42 are not formed in one piece and in that the shaft 42 comprises the shaft of a cylindrical drill 43. The rasp body itself conforms substantially with those of FIGS. 1 and 2. It is again formed as an open ended hollow cylinder whose end wall 44 is formed of such body, that a setscrew 47 can be placed in it to securely clamp the hollow cylinder rasp body 41, which carries the rasp cutting media 45 on its circumference to the shaft 42 of the drill 43. It will be observed by reference to FIG. 4 that the drill mounting is so effected that the tip of the drill protrudes to the desired extend beyond the open end of the rasp body. It will be observed also that the cylinder wall of the body 41, at its open end, again is provided with serrations 46 as previously described in connection with FIGS. 1 and 2.

Figure 5:
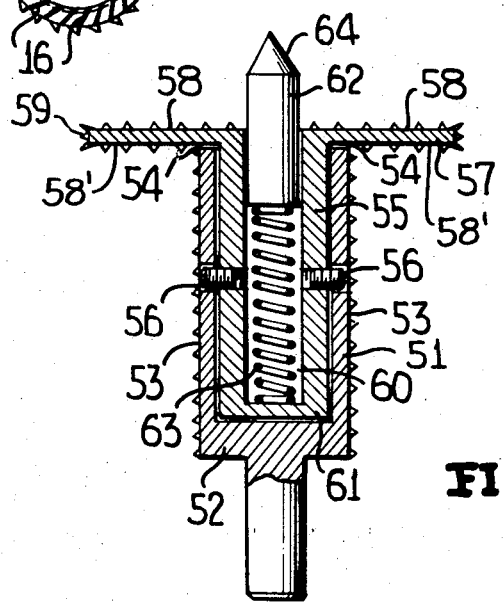
FIG. 5 is a view similar to FIG. 1 and showing a modified embodiment of the tool according to FIG. 3 with an optional insert piece.

In the embodiment of the tool shown in FIG. 5, there is included a rasp tool as described in connection with FIGS. 1 and 2. The cylindrical rasp body 51, open at one end, is connected through the end wall 52 with a shaft adapting the same for clamping to a drive motor. The rasp body 51 is provided with rasp cutting media both on its outer surface at 53 and on its face or open end extremity 54. For this rasp tool, as in FIGS. 1 and 2, there is provided a cylindrical insert 55 that can be introduced into the cylinder opening and which at its outer surface is fitted to the interior surface of the rasp body 51. This insert can be secured against turning in the rasp body 51 by setscrews 56, as clearly shown in FIG. 5. The insert 55 is provided at its end protruding from the rasp body with a flange-like disk 57, which is provided with rasp cutting media both on its face 58 and on its periphery 59. It could, of course, also be provided with rasp cutting media on its back side face 58' for the reasons mentioned in connection with the embodiment of FIG. 3. The insert 55 has a central opening 60 whose diameter corresponds to the diameter of the tap that is to be made. In this central opening 60, which can be closed at its inner end by a wall 61, there is positioned a movable punch 62 acted upon by a spring 63. The punch 62, which protrudes a certain distance from the central opening 60, a shown in FIG. 5, is provided at its outermost or projected end with a conical point 64 which serves to center the tool when starting a tapping operation. By means of this centering point 64, after the longitudinal axis of the tap has been marked and after the point of the cone 64 has been set on the axis mark and the tool pressed on the work piece against the force of the spring 63 until a certain initial piece of the tap has been formed, the tool can be accurately and conveniently started. Then the punch 62 can be removed from the central opening 60 and the tap can be finished.

While preferred embodiments of the invention are shown and described herein, it is to be understood that variations in the disclosed part structures and arrangements may be made without departing from the spirit and scope of the invention as defined in the appended claims.

I claim:

1. A method of forming a rasp comprising the steps of forming a body having a cylindrical exterior surface, forming rasp teeth in the cylindrical exterior surface, and thereafter removing material from said rigid body to form an interior surface which said cylindrical exterior surface defines a thin wall having a terminal annular end wall.

2. The method as defined in claim 1 including the step of thereafter refinishing said annular end wall, and then forming rasp teeth in said refinished annular end wall.

3. The method as defined in claim 1 including the step of thereafter forming rasp teeth in said annular end wall.

4. The method as defined in claim 1 wherein said body is initially solid or only slightly hollowed.

5. The method as defined in claim 2 wherein said body is initially solid or only slightly hollowed.

6. The method as defined in claim 3 wherein said body is initially solid or only slightly hollowed.

7. The method as defined in claim 1 including the step of forming rasp teeth in said end wall prior to the step of removing material from said rigid body to form said interior surface.

8. The method as defined in claim 1 including the steps of forming said annular end wall as a portions of a peripheral flange projecting beyond said cylindrical exterior surface, said peripheral flange including in addition to said annular end wall an opposite annular end wall and a radially outwardlymost cylindrical end wall therebetween, and forming rasp teeth in said first-mentioned annular end wall.

9. The method as defined in claim 8 including the step of forming rasp teeth in said cylindrical wall.

10. The method as defined in claim 8 including the step of forming rasp teeth in said last-mentioned annular end wall.

References Cited

UNITED STATES PATENTS

| | | | |
|---|---|---|---|
| 2,902,259 | 9/1959 | Tilden | 76—101 A |
| 460,312 | 9/1891 | Schweitzer | 29—78 |
| 2,794,469 | 6/1957 | Shortwell | 143—85 A |

HARRISON. L. HINSON, Primary Examiner